United States Patent
Brown et al.

(10) Patent No.: US 9,813,156 B2
(45) Date of Patent: Nov. 7, 2017

(54) HYBRID FIBER/CU DISTRIBUTION POINT WITH EXTERNAL ONU-TO-DSL CONVERSION UNIT

(71) Applicants: TYCO ELECTRONICS UK LTD, Dorcan, Swindon, Wiltshire (GB); TYCO ELECTRONICS CORPORATION, Berwyn, PA (US); TYCO ELECTRONICS RAYCHEM BVBA, Kessel-Lo (BE); David Brown, Bury St Edmunds (GB); David Mather, Altrincham (GB); Robert Neil Shaddock, Doylestown, PA (US); William Atley Weeks, Ivyland, PA (US); Joris Franckx, Bonheiden (BE); Jan Jozef Julia Maria Erreygers, Tielt-Winge (BE)

(72) Inventors: David Brown, Suffolk (GB); David Mather, Cheshire (GB); Robert Neil Shaddock, Doylestown, PA (US); William Atley Weeks, Ivyland, PA (US); Joris Franckx, Bonheiden (BE); Jan Jozef Julia Maria Erreygers, Tielt-Winge (BE)

(73) Assignees: CommScope Connectivity UK Limited, London (GB); CommScope Technologies LLC, Hickory, NC (US); CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 15/033,099

(22) PCT Filed: Oct. 30, 2014

(86) PCT No.: PCT/US2014/063155
§ 371 (c)(1),
(2) Date: Apr. 28, 2016

(87) PCT Pub. No.: WO2015/066327
PCT Pub. Date: May 7, 2015

(65) Prior Publication Data
US 2016/0269115 A1    Sep. 15, 2016

Related U.S. Application Data

(60) Provisional application No. 61/899,063, filed on Nov. 1, 2013.

(51) Int. Cl.
*H04B 10/00*    (2013.01)
*H04B 10/25*    (2013.01)
(Continued)

(52) U.S. Cl.
CPC ....... *H04B 10/2504* (2013.01); *G02B 6/3817* (2013.01); *H04B 10/27* (2013.01); *H04B 10/272* (2013.01); *H04Q 11/0067* (2013.01)

(58) Field of Classification Search
CPC ............................. H04B 10/27; H04B 10/272
See application file for complete search history.

(56) References Cited

U.S. PATENT DOCUMENTS

2007/0280610 A1* 12/2007 Mallya et al. ....... G02B 6/4416
                                                      385/101
2009/0060495 A1    3/2009 Wurst et al.
(Continued)

FOREIGN PATENT DOCUMENTS

EP    1199587    4/2002
GB    2289140    11/1995
(Continued)

OTHER PUBLICATIONS

International Search Authority, "International Search Report and Written Opinion", "from PCT Application No. PCT/US2014/063155", Jan. 27, 2015, pp. 1-10.
(Continued)

*Primary Examiner* — Daniel Dobson
(74) *Attorney, Agent, or Firm* — Fogg & Powres LLC

(57) ABSTRACT

A hybrid service terminal for use in a passive fiber optic network comprises a plurality of optical fiber connectors, each coupled to a respective optical fiber for receiving downstream optical frames from an Optical Line Terminal (OLT); a plurality of hybrid fiber/copper connectors, each of the hybrid fiber/copper connectors coupled to a respective one of the plurality of optical fiber connectors; and a plurality of electrical connectors configured to receive elec- (Continued)

trical signals from a multi-line converter module over a respective one of a plurality of electrical conductors. One of the plurality of hybrid fiber/copper connectors is configured to provide the downstream optical frames to the multi-line converter module for conversion to the electrical signals. Each of the plurality of electrical connectors is coupled to a respective one of the plurality of hybrid fiber/copper connectors for providing the electrical signals over a respective metallic drop cable coupled to a respective network terminal at a corresponding customer premise.

16 Claims, 4 Drawing Sheets

(51) Int. Cl.
*H04B 10/27* (2013.01)
*G02B 6/38* (2006.01)
*H04B 10/272* (2013.01)
*H04Q 11/00* (2006.01)
*H04J 14/00* (2006.01)

(56) References Cited

U.S. PATENT DOCUMENTS

| 2010/0086123 A1* | 4/2010 | Faulkner ............... H04M 19/08 379/413 |
| 2010/0150556 A1 | 6/2010 | Soto et al. |
| 2011/0019366 A1 | 1/2011 | Xu et al. |
| 2011/0058813 A1 | 3/2011 | Boyd et al. |
| 2012/0033972 A1 | 2/2012 | Dai |
| 2012/0148249 A1 | 6/2012 | Hahm et al. |

FOREIGN PATENT DOCUMENTS

| JP | 2011259221 | 12/2011 |
| JP | 2013031126 | 2/2013 |
| WO | 2013156585 | 10/2013 |

OTHER PUBLICATIONS

European Patent Office, "Extended European Search Report for EP Application No. 14857617.6", "Foreign Counterpart to U.S. Appl. No. 15/033,099", dated May 18, 2017, pp. 1-7, Published in: EP.

* cited by examiner

HYBRID FIBER/CU DISTRIBUTION POINT WITH EXTERNAL ONU-TO-DSL CONVERSION UNIT

CROSS REFERENCE TO RELATED APPLICATIONS

This Application is a 371 National Stage Application, claiming priority to and the benefit of PCT Application No. PCT/US2014/063155, titled "HYBRID FIBER/CU DISTRIBUTION POINT WITH EXTERNAL ONU-TO-DSL CONVERSION UNIT," filed on Oct. 30, 2014, which claims priority to, and benefit of, U.S. Provisional Application No. 61/899,063, titled "HYBRID FIBER/CU DISTRIBUTION POINT WITH EXTERNAL ONU-TO-DSL CONVERSION UNIT," filed on Nov. 1, 2013.

BACKGROUND

Fiber-to-the-X (FTTX) network architectures utilize optical fiber to provide all or part of the local loop to a customer's premise. For example, Fiber-to-the-home (FTTH) network architectures utilize optical fiber as the communication media all the way to the customer's premise. FIG. 1 shows part of a conventional network architecture utilizing a Passive Optical Networks (PON), such as Gigabit PON (GPON), which includes a FTTH implementation for customer premise 115-N. In particular, the optical fiber drop cable 111-N is coupled from a fiber distribution terminal 109 (also referred to herein as a service terminal) to an Optical Network Terminal (ONT) 113 located at the customer's premise 115-N. By using optical fiber as the communication media all the way to each customer's home, FTTH networks can be used to provide such home customers with broadband bandwidth levels associated with fiber optic communication.

However, it may be undesirable to implement FTTH for each customer. For example, installation of optical fiber at a customer's premise or home typically requires physical access to the customer's home and surrounding area in order to dig up the customer's yard and/or surrounding area for burying the fiber drop cable. Physical access to the customer's home is also typically required to terminate the optical fiber at the customer's home. Such access may be undesirable or unavailable. Thus, other fiber implementations utilize copper wiring already present in the customer's premise for at least part of the local loop. For example, as shown in FIG. 1, in Fiber-to-the-distribution point (FTTdp) implementations, a fiber optic drop cable 111-1 is coupled from the passive service terminal 109 to an Optical Network Unit (ONU) converter module 117 at a copper distribution point. A distribution point is a point where multiple copper pairs arrive. Additionally, as used herein, a 'passive' device is a device which does not include electrically powered components whereas an 'active' device includes electrically powered components. The ONU converter module 117 is typically an active multi-line unit configured to perform optical to electrical (O/E) conversion and to distribute the converted electrical signal over a plurality of copper pairs 119. Each of the copper pairs 119 is coupled to a respective customer premise 115. Additionally, the ONU converter module 117 typically includes a copper intercept. A copper intercept provides access to copper pairs 119.

Thus, FTTdp enables distribution of broadband services to customer premises for which FTTH is not available. Additionally, FTTdp enables sharing the O/E conversion function among multiple copper pairs. However, conventional FTTdp network architectures are not easily upgraded, such as when an individual customer premise is upgraded for FTTH connectivity or different transmission technologies. For example, upgrading the service to one customer premise 115 coupled to the ONU converter module 117 may adversely affect the service of other customer premises 115 coupled to the ONU converter module 117 while being upgraded. Hence, there is a need in the art for a fiber network architecture which enables broadband service via existing copper pairs, but which also provides a relatively easy upgrade path.

SUMMARY

In one embodiment, a hybrid service terminal for use in a passive fiber optic network is provided. The hybrid service terminal comprises a plurality of optical fiber connectors, each coupled to a respective optical fiber for receiving downstream optical frames from an Optical Line Terminal (OLT); a plurality of hybrid fiber/copper connectors, each of the hybrid fiber/copper connectors coupled to a respective one of the plurality of optical fiber connectors; and a plurality of electrical connectors configured to receive electrical signals from a multi-line converter module over a respective one of a plurality of electrical conductors. One of the plurality of hybrid fiber/copper connectors is configured to provide the downstream optical frames to the multi-line converter module for conversion to the electrical signals. Each of the plurality of electrical connectors is coupled to a respective one of the plurality of hybrid fiber/copper connectors for providing the electrical signals over a respective metallic drop cable coupled to a respective network terminal at a corresponding customer premise.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
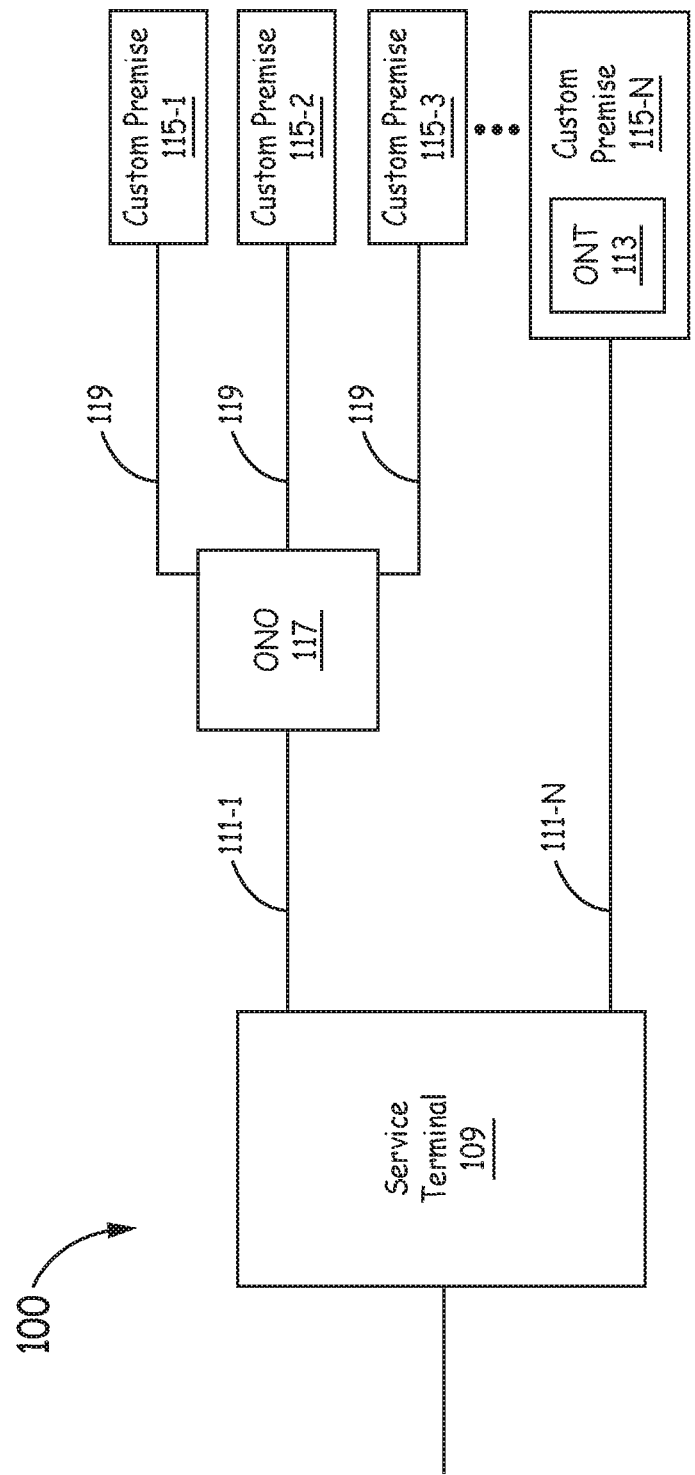
FIG. 1 is block diagram of a conventional optical fiber network.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Figure 2:
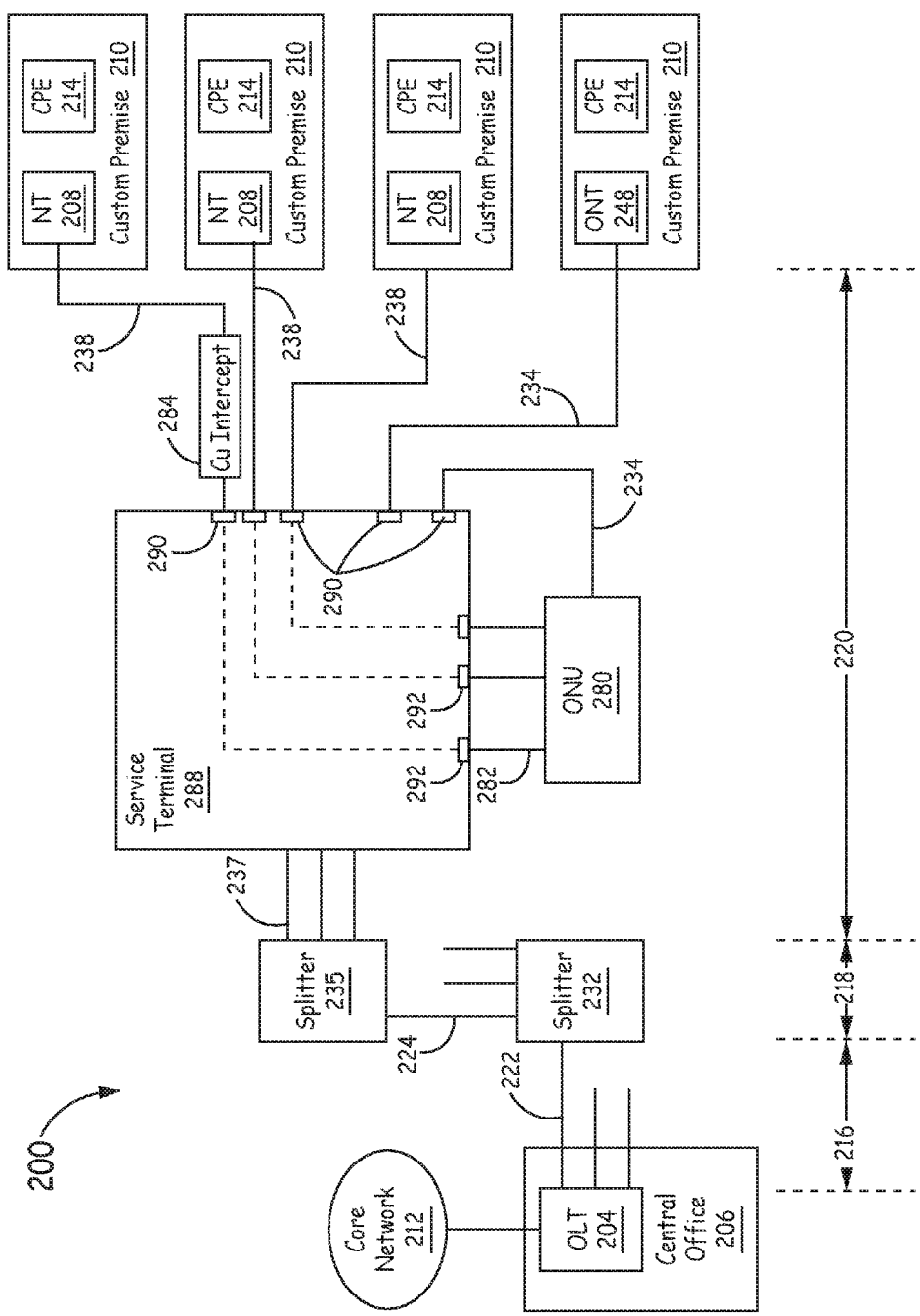
FIG. 2 is a block diagram of one embodiment of an exemplary optical fiber network utilizing a hybrid service terminal.

FIG. 2 is high level block diagram of one embodiment of an exemplary FTTX network utilizing a hybrid service terminal 288 (also referred to herein as a hybrid fiber/copper distribution terminal). The example network 200 shown in FIG. 2 is described here as being implemented as a point-to-multipoint passive optical network (PON), such as a Gigabit PON (GPON). In the example shown in FIG. 2, the network 200 is configured to communicatively couple an optical line terminal (OLT) 204 located in the central office (or other point of presence) 206 of a telecommunication service provider to a respective network terminal 208 in each customer premise 210.

Each OLT 204 serves as an interface and multiplexer between the service provider's core network 212 and the network 200. The service provider's core network 212 can, for example, include or be communicatively coupled to the Internet (not shown), a public switched telephone network (PSTN) (not shown), and/or a video network (not shown). The service provider's core network 212 can include other networks.

Each network terminal 208 presents the service interfaces to the customer premise equipment (CPE) 214. That is, in this embodiment, each network terminal 208 is a part of the telecommunication service provider's network and defines the demarcation point between the telecommunication service provider's network and equipment and the customer premise equipment. The services provided via the service interfaces of each network terminal 208 can include telephony (for example, plain old telephone service (POTS) or voice over IP (VOIP)), data (for example, ETHERNET or V.35), wireless local area network (for example, one or more of the Institute of Electrical and Electronics Engineers (IEEE) 802.11 family of standards, including IEEE 802.11 a/b/g/n/ac) service, and/or video.

In the example shown in FIG. 2, the network 200 includes a feeder section 216, a distribution section 218 and a drop section 220. The feeder section 216 of the network 200 is closest to the central office 206 and couples the OLT 204 to a passive optical splitter 232 via feeder cables 222. The drop section 220 is closest to the customers' premises 210 and couples the hybrid service terminal 288 to the respective network terminals 208. The distribution section 218 couples the feeder section 216 and the drop section 220 to one another. In particular, the passive optical splitter 232 is coupled to another passive optical splitter 235 via distribution optical fibers 224. The second passive optical splitter 235 is coupled to the hybrid service terminal via optical fibers 237. Although shown as separate from the hybrid service terminal 288 in this example, it is to be understood that the second passive optical splitter 235 could also be integrated into the hybrid service terminal 288 in other embodiments.

In the example shown in FIG. 2, each optical signal transmitted from an OLT 204 to the hybrid service terminal 288 travels from the OLT 204 to a respective passive optical splitter 232 (for example, a 1-to-8 passive optical splitter, a 1-to-16 passive optical splitter, or a 1-to-32 passive optical splitter). Each passive optical splitter 232 "splits" the incoming feeder fiber 222 into a number of distribution fibers 224. Thus, downstream optical frames carried on the incoming feeder fiber 222 are provided to each of the distribution fibers 224. The second optical splitter 235 splits the incoming distribution fiber 224 into a number of optical fibers 237 which are coupled to the hybrid service terminal 288.

In this example, payload data for the various services provided to the customer are combined together and used to generate frames of data suitable for communication over the fiber part of the network 200. These frames are also referred to here as "optical frames". Suitable optical protocols and technology can be used for formatting the optical frames and communicating the frames over the network 200 (such as Gigabit-capable Passive Optical Network (GPON) protocols and technology as described ITU-T G.984 series Recommendations, Ten-Gigabit-capable Passive Optical Network (XGPON) protocols and technology as described in ITU-T G.987 series Recommendations, and/or GIGABIT ETHERNET protocols and technology).

Moreover, in the example shown in FIG. 2, multiple optical wavelengths are multiplexed together for communication in both the downstream and upstream directions using wavelength division multiplexing. Other types of multiplexing can also be used (instead of or in addition to wavelength division multiplexing). As used here, the "downstream" direction refers to the direction from the OLTs 204 to the customers' premises 210, and the "upstream" direction refers to the direction from the customers' premises 210 to the OLTs 204.

In the example shown in FIG. 2, in the downstream direction, each passive optical splitter 232 outputs each of the multiple downstream optical signals received on the corresponding feeder fiber 222 onto one of the distribution fibers 224. In this example, in the upstream direction, each passive optical splitter 232 outputs each of the optical signals received on the various distribution fibers 224 onto the corresponding feeder fiber 222. The passive optical splitters 232 can be deployed in various ways. For example, the passive optical splitters 232 can be deployed in fiber distribution hubs (FDH) that are configured for convenient patching or splicing of the fibers 222 and 224 to the passive optical splitters 232. The passive optical splitters 232 can also be deployed in other ways.

The feeder fibers 222 can be deployed using main or trunk cables that bundle together multiple feeder fibers 222 and branch cables that branch one or more individual feeder fibers 222 off from the main or trunk cables at various break out locations in the feeder section 216 of the network 200 (for example, to couple individual feeder fibers 222 to passive optical splitters 232). Likewise, the distribution fibers 224 can be deployed using main or trunk cables that bundle together multiple distribution fibers 224 and branch cables that branch one or more individual distribution fibers 224 off from the main or trunk cables at various break out locations in the distribution section 218 of the network 200 (for example, to couple individual distribution fibers to passive optical splitters 232 or to the hybrid service terminal 288). The feeder fibers 222 and distribution fibers 224 can also be deployed in other ways.

The hybrid service terminal 288 is a hardened outdoor fiber terminal used to terminate drop cables coupling the FTTX network 200 to the customer's premises 210. The hybrid service terminal 288 includes a plurality of hybrid fiber/copper ports 290, as discussed in more detail below with respect to FIG. 3. For customers equipped for FTTH implementations, an optical drop fiber 234 is coupled to a respective one of the hybrid fiber/copper ports 290 of the hybrid service terminal 288 and to an optical network terminal (ONT) 248 at the customer's premise 210.

In conventional FTTX networks, a copper drop cable is coupled indirectly to a service terminal via an ONU converter module, as described above with respect to FIG. 1. In contrast to conventional FTTX networks, however, customer premises which utilize a metallic medium, such as twisted copper pair or coaxial cable, are connected directly to a hybrid fiber/copper port 290 on the hybrid service terminal 288 in network 200. Network 200 includes a multi-line ONU converter module 280 configured to perform optical to electrical (O/E) conversion. The ONU converter module 280 can be a conventional ONU converter module such as ONU converter module 117 in FIG. 1. However, the ONU converter module 280 is not coupled directly to the network terminals 208 in customer premises 210. The ONU converter module 280 is coupled to a fiber drop cable 234 to receive/transmit optical signals from/to the hybrid service terminal 288. The ONU converter module 280 also outputs the As discussed above, the ONU converter module 280 performs O/E conversion. Additionally, the ONU converter module 280 transmits and receives electrical signals over a metallic medium using a transmission technology such as the Very-high-bit-rate digital subscriber line 2 (VDSL2) technology defined in standard ITU-T G.993.2 or the G.Fast technology described in Recommendation ITU-T G.9700. Additionally, in some embodiments, since VDSL2 and G.Fast operate in different frequency bands, the ONU converter module 280 can be configured for both access technologies and automatically detect the appropriate technology to use.

The ONU converter module 280 outputs and receives electrical signals over a plurality of electrical conductor cables 282 which are coupled to corresponding electrical connectors 292 in the hybrid service terminal 288. Each of the electrical connectors 292 is coupled to a corresponding hybrid fiber/copper port 290. In this way, the electrical signals are provided over metallic drop cables 238 to the respective customer premise 210.

Active circuitry in the ONU converter module 280 for performing the O/E conversion function can be powered through 'reverse power feeding', 'forward power feeding', or a combination thereof. Reverse power feeding refers to receiving power from the respective customer premise 210 via the metallic drop cables 238. The reverse power feeding is also routed through the hybrid service terminal 288 to the ONU converter module 280 in network 200. Forward power feeding refers to receiving power from the network side of the hybrid service terminal 288. For example, in some such forward power feeding embodiments, the hybrid service terminal 288 is configured to provide power from the network 200 to the ONU converter module 280 via the electrical connectors 292 and the electrical conductor cables 282.

The hybrid service terminal 288 and configuration of network 200 enables an easy upgrade path on an individual port basis. For example, if a customer is prepared to migrate to FTTH service, the corresponding metallic drop cable 238 is disconnected from the respective hybrid fiber/copper port 290 on the hybrid service terminal 288. A fiber optic drop cable can then be inserted into the corresponding hybrid fiber/copper port 290 to provide a fiber connection to an optical network terminal in the customer premise. The upgrade is performed without modifying the ONU converter module 280 or affecting service provided by the other metallic drop cables 238. Furthermore, the hybrid service terminal 288 of network 200 is configured, in some embodiments, to have the same number of hybrid fiber/copper ports 290 as customer premises 210 coupled to the hybrid service terminal 288. Thus, the network 200 is prepared to implement FTTH for each customer premise 210 by replacing the corresponding metallic drop cable 238 without additional required upgrades to the hybrid service terminal 288 or other network infrastructure. When the last customer premise 210 migrates to FTTH service, the optical fiber drop cable 238 coupling the ONU converter module 280 to the hybrid service terminal 288 is disconnected from the ONU converter module 280 and the corresponding hybrid fiber/copper port 290. An optical fiber drop cable 238 can then be couple the last customer premise 210 to the hybrid fiber/copper port 290 which was previously coupled to the ONU converter module 280.

Hence, system 200 enables flexibility in deploying FTTdp and FTTH in parallel. Furthermore, the system 200 provides an easy upgrade option to FTTH on a port-by-port basis. In addition, through the use of the hybrid service terminal 288, the accompanying infrastructure is ready for implementing FTTH for each customer premise coupled to the hybrid service terminal 288.

Figure 3:
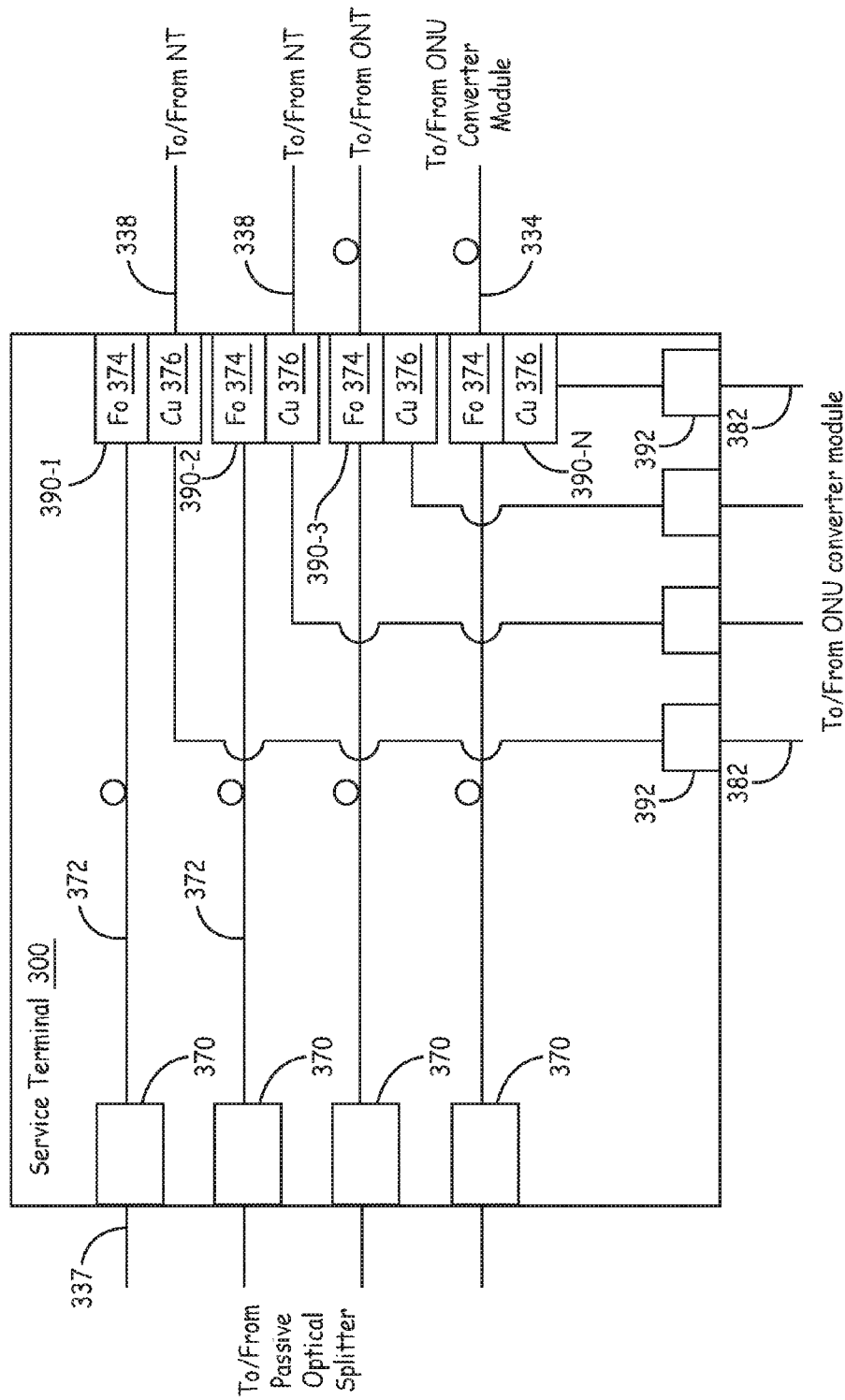
FIG. 3 is a block diagram of one embodiment of an exemplary hybrid service terminal.
Figure 4:
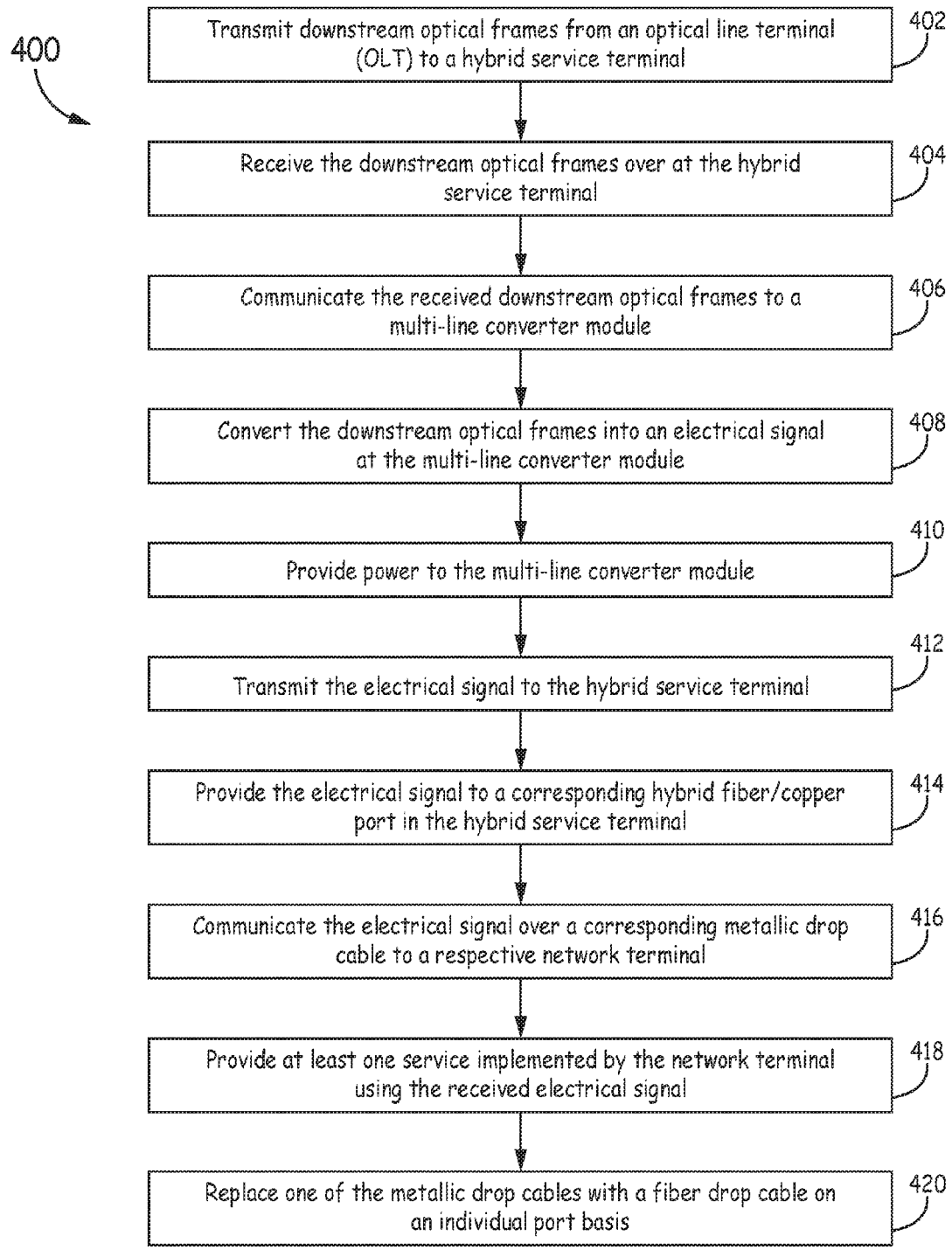
FIG. 4 is a flow chart depicting one embodiment of an exemplary method of communicating data from an OLT to a customer premise.

FIG. 3 is a block diagram depicting one embodiment of an exemplary hybrid service terminal 300 for use in a FTTX network such as network 200 described above. In the example of FIG. 3, hybrid service terminal 300 includes a plurality of optical fiber connectors 370 which are coupled to a passive optical fiber splitter, such as splitter 235, via optical fibers 337. Each optical fiber connector 370 is coupled to a fiber portion 374 of a corresponding hybrid fiber/copper connector 390 via an optical medium 372. A copper portion 376 of each hybrid fiber/copper connector 390 is coupled to a corresponding electrical connector 392. Although only 4 hybrid fiber/copper connectors, optical fiber connectors 370 and electrical connectors 392 are shown in FIG. 4 for purposes of illustration, it is to be understood that other numbers of connectors can be used in other embodiments. For example, in other embodiments, 8 or 12 hybrid fiber/copper connectors are implemented. Furthermore, in some embodiments, the hybrid service terminal 300 is configured to have the same number of hybrid fiber/copper ports 390 as customer premises coupled to the hybrid service terminal 300. For example, a metallic drop cable can be coupled to the copper portion 376 of hybrid fiber/copper connector 390-N to provide electrical signals to a network terminal.

A fiber portion 374 of the hybrid fiber/copper connector 390-N is coupled via a fiber drop cable 334 to an ONU converter module, such as ONU converter module 280 discussed above. In addition, each of the electrical connectors 392 is coupled to the ONU converter module via electrical conductor cables 382. Thus, by connecting a metallic drop cable 338 to a copper portion of hybrid fiber/copper connectors 390, the hybrid service terminal provides FTTdp and FTTH in parallel. In addition, by simply replacing the metallic drop cables 338 with optical fiber drop cables, the FTTdp service provided to a customer premise can be upgraded to FTTH. Thus, the upgrade is accomplished without affecting the ONU converter module or the FTTdp service provided to other customer premises.

FIG. 4 is a flow chart depicting one embodiment of an exemplary method 400 of communicating using a passive fiber optic network such as network 200 described above. At block 402, downstream optical frames are transmitted from an optical line terminal (OLT) in the passive fiber optic network to a hybrid service terminal having a plurality of hybrid fiber/copper ports, such as the hybrid service terminal 400 described above. The number of hybrid fiber/copper ports in the hybrid service terminal matches the total number of network terminals coupled to the hybrid service terminal. At block 404, the downstream optical frames are received at the hybrid service terminal. At block 406, the hybrid service terminal communicates the received downstream optical frames to a multi-line ONU converter module via an optical fiber drop cable coupled to one of the hybrid fiber/copper ports.

At block 408, the ONU converter module converts the downstream optical frames into an electrical signal. At block 410, power is provided to the ONU converter module for providing the Optical/Electrical conversion. In some embodiments the power is provided over a metallic medium coupling the hybrid service terminal to respective network terminals, as discussed above.

At block 412, the ONU converter module transmits the electrical signal over a plurality of electrical conductor cables to corresponding electrical connectors in the hybrid service terminal. In some embodiments, VDSL2 technology is used to transmit the electrical signals. In other embodiments, other technologies such as G.Fast are used to transmit the electrical signals. Additionally, the electrical conductor cables are implemented as twisted copper pairs in some embodiments. In other embodiments, other metallic media, such as coaxial cable are used.

At block 414, the electrical signals are provided from each electrical connector to a corresponding hybrid fiber/copper port in the hybrid service terminal. At block 416, the electrical signals are communicated over a corresponding metallic drop cable to a respective network terminal at a corresponding customer premise. At block 418, at least one service implemented by the network terminal is provided to customer premise equipment using the received electrical signal. Such services include, but are not limited to, voice and data services. At block 420, one of the metallic drop cables is replaced with a fiber drop cable to upgrade to FTTH service for the respective customer premise on an individual port basis without interrupting service to other network terminals coupled to the hybrid service terminal, as discussed above.

Example Embodiments

Example 1 includes a hybrid service terminal for use in a passive fiber optic network, the hybrid service terminal comprising: a plurality of optical fiber connectors, each coupled to a respective optical fiber for receiving downstream optical frames from an Optical Line Terminal (OLT); a plurality of hybrid fiber/copper connectors, each of the hybrid fiber/copper connectors coupled to a respective one of the plurality of optical fiber connectors; and a plurality of electrical connectors configured to receive electrical signals from a multi-line converter module over a respective one of a plurality of electrical conductors; wherein one of the plurality of hybrid fiber/copper connectors is configured to provide the downstream optical frames to the multi-line converter module for conversion to the electrical signals; wherein each of the plurality of electrical connectors is coupled to a respective one of the plurality of hybrid fiber/copper connectors for providing the electrical signals over a respective metallic drop cable coupled to a respective network terminal at a corresponding customer premise.

Example 2 includes the hybrid service terminal of Example 1, wherein the plurality of hybrid fiber/copper connectors comprises one of 4, 8, or 12 hybrid fiber/copper connectors.

Example 3 includes the hybrid service terminal of any of Examples 1-2, wherein the number of hybrid fiber/copper connectors matches the total number of customer premises coupled to the hybrid service terminal.

Example 4 includes a passive fiber optic network comprising: an optical line terminal (OLT) to couple the FTTH network to a core network; a hybrid service terminal that is optically coupled to the OLT via at least one optical fiber, the hybrid service terminal comprising a plurality of hybrid fiber/copper connectors; a plurality of network terminals, each network terminal configured to provide a service to respective customer premises equipment (CPE); and a converter module coupled to one of the hybrid fiber/copper connectors via a fiber drop cable, the converter module configured to convert optical signals received over the fiber drop cable to an electrical signal and to transmit the electrical signal over each of a plurality of electrical conductors to a respective one of a plurality of electrical connectors in the hybrid service terminal; wherein the hybrid service terminal is configured to provide the electrical signals received over each of the plurality of electrical connectors to a corresponding one of the hybrid fiber/copper connectors for communication to a respective one of the plurality of network terminals via a respective one of a plurality of metallic drop cables.

Example 5 includes the passive fiber optic network of Example 4, wherein the number of hybrid fiber/copper connectors in the hybrid service terminal matches the number of network terminals coupled to the hybrid service terminal.

Example 6 includes the passive fiber optic network of any of Examples 4-5, wherein the converter module receives power over the plurality of metallic drop cables coupling the hybrid service terminal to the respective network terminals.

Example 7 includes the passive fiber optic network of any of Examples 4-6, wherein each of the metallic drop cables is comprised of a twisted copper pair.

Example 8 includes the passive fiber optic network of any of Examples 4-7, wherein the converter module is configured to transmit electrical signals according to Very-high-bit-rate digital subscriber line 2 (VDSL2) technology.

Example 9 includes the passive fiber optic network of any of Examples 4-8, wherein the converter module is configured to transmit electrical signals according to G.Fast technology.

Example 10 includes the passive fiber optic network of any of Examples 4-9, wherein the passive fiber optic network comprises at least one of a Gigabit-capable Passive Optical Network (GPON), a Ten-Gigabit-capable Passive Optical Network (XGPON), and an ETHERNET Passive Optical Network (EPON).

Example 11 includes a method of communicating using a passive fiber optic network, the method comprising: transmitting downstream optical frames from an optical line terminal (OLT) in the passive fiber optic network to a hybrid service terminal having a plurality of hybrid fiber/copper ports; receiving the downstream optical frames at the hybrid service terminal; communicating the received downstream optical frames to a multi-line converter module via an optical fiber drop cable coupled to one of the plurality of hybrid fiber/copper ports; converting the downstream optical frames into an electrical signal at multi-line converter module; transmitting the electrical signal from the multi-line converter module over each of a plurality of electrical conductors to a respective one of a plurality of electrical connectors in the hybrid service terminal; providing the electrical signal received over each of the plurality of electrical connectors to a corresponding one of the hybrid fiber/copper ports; communicating the electrical signal over each of a plurality of metallic drop cables to a respective one of a plurality of network terminals; and providing at least one service implemented by the respective network terminals using the received electrical signal.

Example 12 includes the method of Example 11, further comprising: providing power to the converter module over the plurality of metallic drop cables through the hybrid service terminal.

Example 13 includes the method of any of Examples 11-12, wherein transmitting the electrical signal from the multi-line converter module over each of a plurality of electrical conductors comprises transmitting the electrical signal from the multi-line converter module over each of a plurality of twisted copper pairs.

Example 14 includes the method of any of Examples 11-13, wherein transmitting the electrical signal from the multi-line converter module comprises transmitting the electrical signal according to Very-high-bit-rate digital subscriber line 2 (VDSL2) technology.

Example 15 includes the method of any of Examples 11-14, wherein transmitting the electrical signal from the multi line converter module comprises transmitting the electrical signal according to G.Fast technology.

Example 16 includes the method of any of Examples 11-15, further comprising: replacing one of the metallic drop cables with an optical fiber drop cable on an individual port basis without interrupting service to other network terminals coupled to the hybrid service terminal.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

PARTS LIST

111 Optical fiber drop cable
113 Optical network terminal
115 Customer premise
117 Optical Network Unit
119 Copper pair
200 Network
204 Optical Line Terminal
206 Central Office
208 Network Terminal
210 Customer Premise
212 Core Network
214 Customer Premise Equipment
216 Feeder Section
218 Distribution Section
220 Drop Section
222 Feeder Fiber
224 Distribution Optical Fibers
232 Passive Optical Splitter
234 Optical Drop Fiber
235 Passive Optical Splitter
236 Single Line Converter Module
237 Optical Fiber
238 Metallic Drop Cable
248 Optical Network Terminal
280 multi-line ONU converter module
282 electrical conductor cables
284 Copper Intercept
288 hybrid service terminal
290 hybrid fiber/copper ports
292 electrical connectors
300 hybrid service terminal
334 fiber drop cable
337 optical fibers
338 metallic drop cable
370 optical fiber connectors
372 optical medium
374 fiber portion
376 copper portion
382 electrical conductor cables
390 hybrid fiber/copper connector
392 electrical connector
400 hybrid service terminal

What is claimed is:

1. A hybrid service terminal for use in a passive fiber optic network, the hybrid service terminal comprising:
    a plurality of optical fiber connectors, each coupled to a respective optical fiber for receiving downstream optical frames from an Optical Line Terminal (OLT);
    a plurality of hybrid fiber/copper connectors, each of the hybrid fiber/copper connectors coupled to a respective one of the plurality of optical fiber connectors; and
    a plurality of electrical connectors configured to receive electrical signals from a multi-line converter module over a respective one of a plurality of electrical conductors;
    wherein one of the plurality of hybrid fiber/copper connectors is configured to provide the downstream optical frames to the multi-line converter module for conversion to the electrical signals;
    wherein each of the plurality of electrical connectors is coupled to a respective one of the plurality of hybrid fiber/copper connectors for providing the electrical signals over a respective metallic drop cable coupled to a respective network terminal at a corresponding customer premise.

2. The hybrid service terminal of claim 1, wherein the plurality of hybrid fiber/copper connectors comprises one of 4, 8, or 12 hybrid fiber/copper connectors.

3. The hybrid service terminal of claim 1, wherein the number of hybrid fiber/copper connectors matches the total number of customer premises coupled to the hybrid service terminal.

4. A passive fiber optic network comprising:
    an optical line terminal (OLT) to couple a Fiber-to-the-home (FTTH) network to a core network;
    a hybrid service terminal that is optically coupled to the OLT via at least one optical fiber, the hybrid service terminal comprising a plurality of hybrid fiber/copper connectors;
    a plurality of network terminals, each network terminal configured to provide a service to respective customer premises equipment (CPE); and
    a converter module coupled to one of the hybrid fiber/copper connectors via a fiber drop cable, the converter module configured to convert optical signals received over the fiber drop cable to an electrical signal and to transmit the electrical signal over each of a plurality of electrical conductors to a respective one of a plurality of electrical connectors in the hybrid service terminal;
    wherein the hybrid service terminal is configured to provide the electrical signals received over each of the plurality of electrical connectors to a corresponding one of the hybrid fiber/copper connectors for communication to a respective one of the plurality of network terminals via a respective one of a plurality of metallic drop cables.

5. The passive fiber optic network of claim 4, wherein the number of hybrid fiber/copper connectors in the hybrid service terminal matches the number of network terminals coupled to the hybrid service terminal.

6. The passive fiber optic network of claim 4, wherein the converter module receives power over the plurality of metallic drop cables coupling the hybrid service terminal to the respective network terminals.

7. The passive fiber optic network of claim 4, wherein each of the metallic drop cables is comprised of a twisted copper pair.

8. The passive fiber optic network of claim 4, wherein the converter module is configured to transmit electrical signals according to Very-high-bit-rate digital subscriber line 2 (VDSL2) technology.

9. The passive fiber optic network of claim 4, wherein the converter module is configured to transmit electrical signals according to G.Fast technology.

10. The passive fiber optic network of claim 4, wherein the passive fiber optic network comprises at least one of a Gigabit-capable Passive Optical Network (GPON), a Ten-Gigabit-capable Passive Optical Network (XGPON), and an ETHERNET Passive Optical Network (EPON).

11. A method of communicating using a passive fiber optic network, the method comprising:
- transmitting downstream optical frames from an optical line terminal (OLT) in the passive fiber optic network to a hybrid service terminal having a plurality of hybrid fiber/copper ports;
- receiving the downstream optical frames at the hybrid service terminal;
- communicating the received downstream optical frames to a multi-line converter module via an optical fiber drop cable coupled to one of the plurality of hybrid fiber/copper ports;
- converting the downstream optical frames into an electrical signal at multi-line converter module;
- transmitting the electrical signal from the multi-line converter module over each of a plurality of electrical conductors to a respective one of a plurality of electrical connectors in the hybrid service terminal;
- providing the electrical signal received over each of the plurality of electrical connectors to a corresponding one of the hybrid fiber/copper ports;
- communicating the electrical signal over each of a plurality of metallic drop cables to a respective one of a plurality of network terminals; and
- providing at least one service implemented by the respective network terminals using the received electrical signal.

12. The method of claim 11, further comprising:
providing power to the converter module over the plurality of metallic drop cables through the hybrid service terminal.

13. The method of claim 11, wherein transmitting the electrical signal from the multi-line converter module over each of a plurality of electrical conductors comprises transmitting the electrical signal from the multi-line converter module over each of a plurality of twisted copper pairs.

14. The method of claim 11, wherein transmitting the electrical signal from the multi-line converter module comprises transmitting the electrical signal according to Very-high-bit-rate digital subscriber line 2 (VDSL2) technology.

15. The method of claim 11, wherein transmitting the electrical signal from the multi line converter module comprises transmitting the electrical signal according to G.Fast technology.

16. The method of claim 11, further comprising:
replacing one of the metallic drop cables with an optical fiber drop cable on an individual port basis without interrupting service to other network terminals coupled to the hybrid service terminal.

* * * * *